E. A. HEIDTMANN.
FISHING ROD HOLDER.
APPLICATION FILED FEB. 9, 1917.
1,283,511.
Patented Nov. 5, 1918.
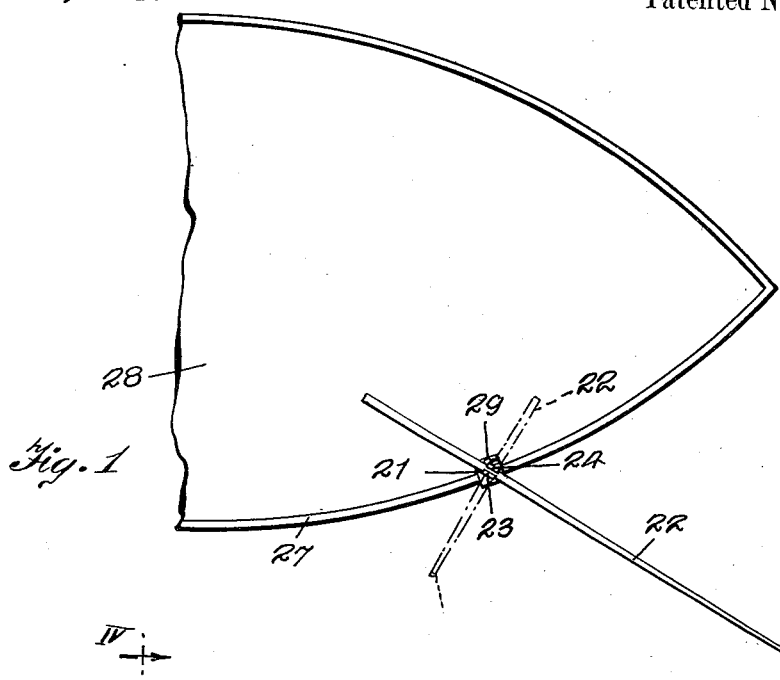
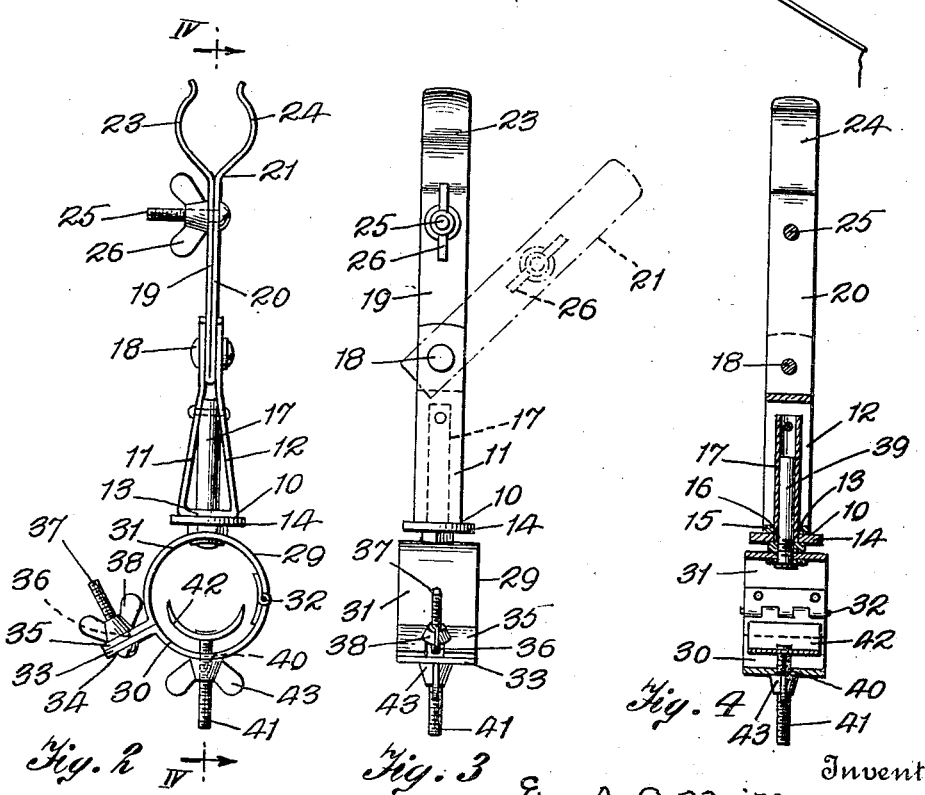
Fig. 1
Fig. 2
Fig. 3
Fig. 4
Inventor
Ernst A. Heidtmann.
By his Attorney
W. T. Criswell

UNITED STATES PATENT OFFICE.

ERNST A. HEIDTMANN, OF RICHMOND HILL, NEW YORK.

FISHING-ROD HOLDER.

1,283,511.　　　Specification of Letters Patent.　　Patented Nov. 5, 1918.

Application filed February 9, 1917. Serial No. 147,605.

*To all whom it may concern:*

Be it known that I, ERNST A. HEIDTMAN, a citizen of the United States, and a resident of Richmond Hill, in the county of Nassau and State of New York, have invented a certain new and useful Improvement in Fishing-Rod Holders, of which the following is a full, clear, and exact specification.

This invention relates to a class of devices adapted to be used in conjunction with the sport of fishing.

My invention has for its object primarily to provide a holder designed to be employed for permitting a fishing rod to be supported in a manner whereby a fish when caught may be easily landed as well as overcoming the requirement when a person is angling of holding the rod, and which will further permit of a single person using more than one rod and line simultaneously for fishing if desired. This is accomplished mainly by providing a body member adapted to be removably applied to the rail of a boat or other support, and on this body is pivoted a clamp for releasably holding a fishing pole so as to be readily swung upwardly and circumferentially to land the fish when caught without the exertion of much strength by the person doing the fishing.

Other objects of the invention are to provide on the body a removable retainer whereby the body may be detachably fastened to a support; and to provide a simple and efficient holder which is susceptible of being made so as to combine great strength and durability.

In the drawing, Figure 1 is a fragmentary view showing a top plan of part of a boat with one form of the device embodying my invention in use for holding a fishing rod.

Fig. 2 is a front elevation of the device.

Fig. 3 is a side elevation thereof, and

Fig. 4 is a detail sectional view taken on the line IV—IV of Fig. 2.

The device, or holder has a body member 10 which may be of any desired size and shape, though this body may be made of a strip of metal bent in approximately a U-shape to provide two spaced arms 11, 12, and a cross-arm 13 at one of the ends thereof. On the underside of the cross-arm 13 of the body may be a plate, as 14, with an aperture 15 therethrough which is in register with a hole 16 provided in the cross-arm, and on the top of this cross-arm is a short tube, as 17, disposed upwardly between the arms 11 and 12 of the body, the passage of this tube being in register with the hole in the cross-arm and with the aperture 15 of the plate 14. The free upper end parts of the arms 11 and 12 may be slightly bent toward each other, and between these bent ends is pivoted, at 18, the lower ends of the complemental members or arms 19 and 20 of a clamp, as 21, serving to releasably hold a fishing pole, as 22. These arms of the clamps 21 are preferably made of a strip of spring metal which is centrally bent to form their lower ends under the pivot 18 integrally with each other, and these arms being of considerable lengths so as to extend some distance above the body 10 their tension will tend to yieldingly force them from each other. The upper free end part of the arm 19 is curved outwardly and inwardly toward the other arm to provide a jaw 23, while the corresponding part of the arm 20 is also curved outwardly and inwardly toward the arm 19 to provide a jaw 24 to coact with the jaw 23. Serving as means to yieldingly force these arms with the jaws of the clamp toward each other, through registered openings in the arms adjacent to the jaws is disposed a threaded bolt 25 of a length so as to extend some distance beyond the arms, and on the threaded end of this bolt is a thumb nut 26 adapted to be rotated into contact with one of the arms which in turn will be yieldingly guided toward the second arm so that the jaws 23 and 24 will likewise be forced toward each other.

To permit the body 10 to be detachably fastened to the rail, as 27, of a boat 28, I provide a retainer, or coupling, as 29. The retainer 29 is composed preferably of two substantially semi-circular metal straps 30 and 31 which are arranged so that their concavities are opposed to each other, and one pair of the opposed ends of these straps are hinged together, at 32, so that the straps may be swung toward and from each other. Projecting laterally from the opposite end of the strap 30 is a lug 33 having a hole 34 therethrough, and also projecting laterally from the second end of the strap 31 is another lug 35 disposed so as to be moved upon and swung from the lug 33 of the strap 30. In the lug 35 is a slot 36 in register with the hole 34 of the lug 33, and in the hole of this lug is a threaded bolt 37 which movably extends through the slot 36 of the lug 35. On the free threaded end portion of the bolt 37 is a thumb nut 38 adapted to be rotatably adjusted to and from contact with the lug 35 for releasably locking the straps 30 and 31 together, as will be hereinafter more fully described. Projecting upwardly from the strap 31 is a post 39 which is removably inserted in the tube 17 of the U-shaped body 10 for detachably as well as pivotally fastening the retainer 29 to the body. According to this construction of the metal straps 30 and 31 when locked together the passage therethrough is of a fixed diameter, and to allow these straps to be attached to the rail of a boat, or other support of less size than the passage, in a threaded opening 40 in the strap 30 is a threaded bolt 41 adapted to be screwed toward and from the concavity of the strap 31. On the end of the bolt 41 between the straps is a plate 42 which is curved oppositely to the curvature of the strap 31 so that these parts will coact to clamp the support therebetween, and to permit the bolt 41 and plate 42 to be releasably held in position when adjusted on the bolt under the strap 30 is a fixed finger nut 43.

To employ the device for holding a fishing rod the straps 30 and 31 are swung to open positions following the removal of the thumb nut 38 from the bolt 37 as well as adjusting the plate 42 toward the strap 30 by operating the bolt 41 accordingly. The straps are then guided over the support so as to be arranged between the plate and the strap 31 after which both of the straps are releasably locked by the thumb nut 38 being rescrewed on the bolt 37 to lock the straps together. By then screwing the bolt 41 inwardly of the straps its plate 42 will be forced into engagement with the support which in turn will cause the retainer to be detachably held against movement on the support. Part of the fishing rod adjacent to its handle may then be removably applied between the jaws 23 and 24 of the clamp 21 after the nut 26 and the bolt 25 are suitably loosened and subsequently tightened by rotating the nut on the bolt to guide the arms 19 and 20 so that the rod will be clamped between the jaws. When the device is fastened in this manner to a support in the form of the rail of a boat the handle of the fishing rod will extend over the hull of the interior of the boat, and when a fish is caught it may be readily landed by forcing downwardly the handle of the rod which will be permitted by reason of the clamp 21 being likewise swung on the body 10. Then by swinging the fishing rod together with the clamp and the body circumferentially on the post 39 of the retainer the opposite end of the rod with its line will be likewise swung so as to land a fish on the line into the boat. Thus a simple and efficient holder is provided whereby a fishing rod may be removably supported in a manner to facilitate the landing of fish when caught as well as avoiding the requirement of the rod being carried by the person doing the fishing.

In the foregoing description, I have embodied the preferred form of my invention, but I do not wish to be understood as limiting myself thereto, as I am aware that modifications may be made therein without departing from the principle, or sacrificing any of the advantages of this invention; therefore I reserve to myself the right to make such changes as fairly fall within the scope thereof.

Having thus described my invention, I claim as new and desire to secure by Letters Patent:—

A fishing rod holder including a coupling adapted to be fastened to a support, a substantially U-shaped body member having its cross-arm rotatably mounted on the coupling, and two corresponding yielding arms projecting above the body member, said arms having their lower ends pivoted between the arms of the body member and the upper end parts of said yielding arms being oppositely curved to provide a jaw.

This specification signed and witnessed this eighth day of February, A. D. 1917.

ERNST A. HEIDTMANN.

Witnesses:
GEORGE F. BENTLEY,
V. M. RUMPH.